United States Patent
Bietsch et al.

(10) Patent No.: US 10,379,262 B2
(45) Date of Patent: Aug. 13, 2019

(54) MANUFACTURE OF OPTICAL ELEMENTS BY REPLICATION AND CORRESPONDING REPLICATION TOOLS AND OPTICAL DEVICES

(71) Applicant: ams Sensors Singapore Pte. Ltd., Singapore (SG)

(72) Inventors: Alexander Bietsch, Thalwil (CH); Michel Barge, Aeugst-am-Albis (CH)

(73) Assignee: ams Sensors Singapore Pte. Ltd., Singapore (SG)

(*) Notice: Subject to any disclaimer, the term of this patent is extended or adjusted under 35 U.S.C. 154(b) by 23 days.

(21) Appl. No.: 15/310,842

(22) PCT Filed: May 14, 2015

(86) PCT No.: PCT/SG2015/050112
§ 371 (c)(1),
(2) Date: Nov. 14, 2016

(87) PCT Pub. No.: WO2015/174929
PCT Pub. Date: Nov. 19, 2015

(65) Prior Publication Data
US 2017/0090074 A1    Mar. 30, 2017

Related U.S. Application Data

(60) Provisional application No. 61/994,315, filed on May 16, 2014.

(51) Int. Cl.
*G02B 3/00* (2006.01)
*B32B 3/26* (2006.01)
(Continued)

(52) U.S. Cl.
CPC ............ *G02B 3/0031* (2013.01); *B29D 11/00* (2013.01)

(58) Field of Classification Search
CPC ..... Y10T 428/24479; Y10T 428/24488; Y10T 428/24612; G02B 3/0006; G02B 3/0031;
(Continued)

(56) References Cited

U.S. PATENT DOCUMENTS 5,337,179 A * 8/1994 Hodges .............. B29D 11/0073
359/443
2008/0054506 A1    3/2008 Rudmann et al.
(Continued)

FOREIGN PATENT DOCUMENTS

CN    101426638    5/2009
CN    101520521    9/2009
(Continued)

OTHER PUBLICATIONS

Supplementary EP Search Report issued in European Application No. 15792431.7, dated Nov. 20, 2017 (1 page).
(Continued)

*Primary Examiner* — Joanna Pleszczynska
(74) *Attorney, Agent, or Firm* — Fish & Richardson P.C.

(57) ABSTRACT

A replication tool for producing an optical structure comprising an optical element includes a central section having the shape defining a negative of a portion of the optical structure and a vertically aligned central axis; a surrounding section laterally surrounding the central section; and one or more contact standoffs defining a plane referred to as contact plane. In a first azimuthal range, the surrounding portion provides a first compensation surface facing away from the central axis, and in a second azimuthal range, the surrounding portion provides a second compensation surface facing away from the central axis. In any cross-section containing the central axis in the second azimuthal range, a steepness of the second compensation surface is higher than a steepness (Continued)

of the first compensation surface in any cross-section containing the central axis in the first azimuthal range.

4 Claims, 2 Drawing Sheets

(51) Int. Cl.
*B32B 3/30* (2006.01)
*B29D 11/00* (2006.01)
(58) Field of Classification Search
CPC ......... G02B 3/0056; B32B 3/263; B32B 3/30; B29D 11/00; B29D 11/0057
See application file for complete search history.

(56) References Cited

U.S. PATENT DOCUMENTS

| 2009/0213476 A1 | 8/2009 | Takumi et al. |
| 2012/0075709 A1 | 3/2012 | Teramoto et al. |
| 2013/0071632 A1 | 3/2013 | Fujishiro et al. |
| 2018/0141291 A1 | 5/2018 | Imai et al. |

FOREIGN PATENT DOCUMENTS

| CN | 102458807 | 5/2012 |
| EP | 1 837 165 | 9/2007 |
| JP | 2007-310253 | 11/2007 |
| JP | 2009-530135 | 8/2009 |
| JP | 2011 246314 A | 12/2011 |
| TW | 200740583 | 11/2007 |
| TW | 201239410 | 10/2012 |
| WO | 2004068198 | 8/2004 |
| WO | 2007/107025 | 9/2007 |
| WO | 2011/158725 | 8/2013 |
| WO | 2014/042591 | 3/2014 |
| WO | 2013/089223 | 4/2015 |

OTHER PUBLICATIONS

Chinese Office Action in Chinese Application No. 201580025097.4, dated May 29, 2018, 10 pages (English Translation).
Taiwan Intellectual Property Office (IPO), Search Report issued in Taiwan Application No. 104115385, dated Dec. 21, 2018, 1 page.

\* cited by examiner

MANUFACTURE OF OPTICAL ELEMENTS BY REPLICATION AND CORRESPONDING REPLICATION TOOLS AND OPTICAL DEVICES

BACKGROUND OF THE INVENTION

Field of the Invention

The invention relates to the field of optics, in of particular micro-optics, and more specifically to the manufacturing of optical components. More particularly, it relates to replication tools and to optical devices and to methods for manufacturing the same.

Description of Related Art

Definition of Terms

"Active optical component": A light sensing or a light emitting component. E.g., a photodiode, a photodiode array, an image sensor, an LED, an OLED, a laser chip. An active optical component can be present as a bare die or in a package, i.e. as a packaged component.

"Passive optical component": An optical component redirecting light by refraction and/or diffraction and/or (internal and/or external) reflection such as a lens, a prism, another diffractive or refractive structure, a mirror, or an optical system, wherein an optical system is a collection of such optical components possibly also including mechanical elements such as aperture stops, image screens, holders.

"Opto-electronic module": A component in which at least one active and at least one passive optical component is comprised.

"Replication": A technique by means of which a given structure or a negative thereof is reproduced. E.g., etching, embossing (imprinting), casting, molding.

"Wafer": A substantially disk- or plate-like shaped item, its extension in one direction (z-direction or vertical direction or stacking direction) is small with respect to its extension in the other two directions (x- and y-directions or lateral directions). Usually, on a (non-blank) wafer, a plurality of like structures or items are arranged or provided therein, typically on a rectangular grid. A wafer may have openings or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may prevailingly be made of, e.g., a semiconductor material, a polymer material, a composite material including metals and polymers or polymers and glass materials. In particular, hardenable materials such as thermally or UV-curable polymers are interesting wafer materials in conjunction with the presented invention.

"Lateral": cf. "Wafer" (note that a substrate can be a wafer or a portion of a wafer)

"Vertical": cf. "Wafer" (note that a substrate can be a wafer or a portion of a wafer)

"Light": Most generally electromagnetic radiation; more particularly electromagnetic radiation of the infrared, visible or ultraviolet portion of the electromagnetic spectrum.

From EP 1 837 165 A1, methods for molding optical elements are know in which tools are used which have an overflow volume. Various kinds of such tools are described therein.

The invention emerged from the desire to be able to produce optical elements on a substrate under strong space restrictions. Miniaturization and the need to provide more and more functionality per substrate area are important issues in micro-optics. In addition, when optical elements shall be produced in mass production, a high process stability must be reached in order to achieve a suitable yield and thus an efficient manufacturing process.

In particular, it may occur that an optical element, e.g., a lens element, shall be present close to another item such as to another optical element or to a portion of a spacer for keeping two wafers or substrates in a well-defined mutual distance. And therein, it may be provided that in some direction, e.g., in a direction pointing away from the other item, more space is available.

In such a case with asymmetric space restrictions, it can be useful to carry out the manufacture of the optical element or of an optical device including the optical element in such a way that the footprint of an optical structure including the optical element is asymmetric, too, and in particular adjusted to the asymmetric spacial restrictions.

In particular, an optical structure may be manufactured using an embossing-type process, in which a replication tool is used for manufacturing an optical element on a substrate. And more particularly, it is possible to provide that more replication material is used in such an embossing-type process than finally present in the optical element itself. Particularly, it is possible in such an embossing-type process to produce an optical structure which includes the optical element and, in addition, a surrounding portion, which is present around the optical element. One reason for providing the additional amount of replication material (excess replication material) and the surrounding portion, respectively, is that a dispensing process in which the replication material is applied between the replication tool and the substrate (typically on one or both of them) has a limited precision. And furthermore, the surrounding portion can make possible to control the flow of the replication material during the embossing process. And, the provision of excess replication material can contribute to prevent the formation of voids in the optical element.

It occurred to the inventors that specific designs of replication tools make possible to achieve not only a great process stability but at the same time also a strongly asymmetric footprint of the optical structure produced in an embossing-type replication process on a substrate. Vice versa, it occurred to the inventors that specific types or designs of optical structures or optical devices including an optical element and a surrounding portion are particularly suitable for mass-production under asymmetric space restrictions.

An additional restriction can be present in case the replication tool to be used in the embossing process is manufactured using a process having only a limited vertical range in which structuring of the replication tool (during manufacture of the replication tool) is possible. Thus, it may be provided that the replication tool is structured within a limited (typically predetermined) maximum vertical range only, thus limiting a (maximum) height (maximum vertical extension) of the surrounding portion (and the optical element) can assume.

SUMMARY OF THE INVENTION

Therefore, one object of the invention is to create a way of manufacturing optical elements or optical structures including an optical element each or optical devices including an optical element or an optical structure each, which is particularly suitable for mass production in combination with asymmetric space restrictions. In addition to the manufacturing method, corresponding replication tools and corresponding optical devices shall be provided.

Another object of the invention is to provide a way of tailoring a footprint of an optical structure on a substrate.

Another object of the invention is to provide a way of minimizing a footprint of an optical structure including an optical element in at least one direction, in particular wherein a replication tool is used which is manufactured using a tool manufacturing process limiting a vertical range within which the replication tool is structurable.

Further objects emerge also from the description and the embodiments below.

At least one of these objects is at least partially achieved by apparatuses and methods according to the patent claims.

An important insight gained by the inventors is that providing a replication tool having different steepnesses in different directions can make possible to produce optical structures having a strongly asymmetric footprint, while ensuring a good flow control for the replication material, thus making possible a good process stability and high yield.

A bit more specifically, the replication tool has a surrounding section laterally surrounding a central section, and in the surrounding section, a surface ("compensation surface", cf. below) is present which increases in height (vertical direction, away from the place where a substrate will be located) more strongly in some lateral directions (namely where little space only may be taken by the optical structure) than in other directions (namely where space restrictions for the optical structure are less strong).

The corresponding replication tool may be described more precisely as a replication tool for producing an optical structure including an optical element which includes:

a central section having the shape defining a negative of a portion of the optical structure, the central section having a vertically aligned central axis (which may, e.g., coincide with an optical axis of the optical structure);

a surrounding section laterally surrounding the central section;

one or more contact standoffs defining a plane referred to as contact plane;

wherein all portions of the replication tool are arranged on one and the same side of the contact plane. A direction pointing from the contact plane into said side along a direction aligned perpendicular to the contact plane is referred to as vertical direction, and lateral directions are defined as directions perpendicular to the vertical direction.

Furthermore, in a first azimuthal range, the surrounding portion provides a surface facing away from the central axis, referred to as first compensation surface; and in a second azimuthal range (which usually is meant to be free from overlap with the first azimuthal range), the surrounding portion provides a surface facing away from the central axis, which is referred to as second compensation surface. An azimuthal range is defined as an angular range in a lateral plane about the central axis.

And in any cross-section containing the central axis in the second azimuthal range, a steepness of the second compensation surface is higher than a steepness of the first compensation surface in any cross-section containing the central axis in the first azimuthal range, wherein the steepnesses are both defined as an increase in vertical coordinate of the respective surface per increase in distance from the central axis of the respective surface. In case of steepnesses that are not constant but vary with the distance to the central axis, the steepness shall be the averaged steepness, more particularly the steepness then shall be the value obtained by averaging steepness.

The steepnesses can also be considered (in a more mathematical way) as the derivation of the function describing the profile of the respective compensation surface in the respective cross-section in dependence of a radial coordinate (which designates the before-mentioned distance from the central axis) with respect to said radial coordinate. Therein, the radial coordinate is zero at the central axis and increases towards the surrounding portion, and the vertical coordinate is zero at the contact plane and increases in the direction where the replication tool (and the respective compensation surface) is. The vertical coordinate is a coordinate parallel (and not antiparallel) to the vertical direction.

Providing the compensation surfaces with the steepnesses can allow to keep the footprint of the optical structure relatively small in the second azimuthal range and relatively large in the first azimuthal range. It can in particular make possible that, in the first azimuthal range, a radial extension of the optical structure minus a radial extension of the optical element is at least three times, more particularly at least five times, and even more particularly at least eight times the radial extension of the optical structure minus a radial extension of the optical element in the second azimuthal range (the radial extensions constituting lateral extensions). In case the optical structure is substantially composed of the optical element the shape of which is predominantly determined by the central section and and a surrounding portion the shape of which is predominantly determined by the surrounding section and/or in case a boundary of a footprint of the optical structure is essentially identical with an outer contour of an interface between the replication material of the surrounding section and the substrate on which the optical structure is produced (or a surface of the substrate), it can be provided that a radial (lateral) extension of the surrounding portion in the first azimuthal range is at least three times, more particularly at least five times, and even more particularly at least eight times the radial (lateral) extension of the surrounding portion in the second azimuthal range.

The magnitudes described and compared in the paragraph above can more simply, but less precisely, also be described as the radial extension (at first substrate surface) of the optical structure in excess to the optical element, in the first and in the second azimuthal range, respectively.

Such strong asymmetries in the lateral extension make possible to manufacture optical elements in very close proximity to close-by further items.

The above-mentioned increase (in particular in a coordinate) can also be negative, namely in case it actually is a decrease. As will be explained below, it is also possible to provide corresponding second compensation surfaces.

The central axis corresponds to a central axis of the optical element and can be defined, e.g., as the vertically aligned axis passing through the center of mass of the footprint of the optical element on the substrate. In particular, the boundary of said footprint can be understood as the outer contour of the interface between the substrate and that portion of the replication material which constitutes the optical element. In case of an optical element with a circular aperture shape, e.g., in case of a spherical lens element, the central axis coincides with the optical axis of the optical element.

The central axis is mainly referred to above in order to be able clearly define the position of cross-sections and directions and distances concerning the optical structure. Accordingly, other definitions of the central axis could be used alternatively.

Usually, the surrounding section adjoining (abuts) the central section.

The one or more contact standoffs are mainly referred to above in order to be able clearly define the contact plane and thus directions and distances concerning the optical structure. However, the provision of the one or more contact standoffs makes possible to define with high precision the vertical distance between a substrate on which the optical structure shall be produced (more precisely a surface of said substrate) and the replication tool in the central section. Thus, vertical dimensions of the optical element can be defined with high precision by means of the contact standoffs.

The first azimuthal range usually is continuous. And the second azimuthal range usually is continuous. And the azimuthal ranges may generally have any size.

In particular, however, the second azimuthal range may be, e.g., at least 30° or at least 45°, in particular at least 60°, but also second azimuthal ranges of at least 90° or at least 130° may be provided.

The first azimuthal range may be, e.g., at least 30° or at least 45°, in particular at least 60°, but also first azimuthal ranges of at least 90° or at least 130° may be provided.

The compensation surfaces are meant to provide surfaces at which excess replication material may adhere. In that sense, the compensation surfaces compensate for the case that (much) too much replication material is present between the replication tool and the substrate during the embossing process. The compensation surfaces may be different sections of one and the same (continuous) surface, in particular wherein that one (continuous) surface may completely laterally surround the central section. And more particularly, it may be provided that the compensation surfaces together constitute one (continuous) surface, and moreover, that one (continuous) surface may completely laterally surround the central section.

It may be provided that one or both of the steepnesses is/are not constant (along a lateral (radial) coordinate in a respective cross-section containing the central axis). In that case, it may in particular be provided that any steepness of the second compensation surface in the respective cross-section (in the first azimuthal range) is higher than any steepness of the first compensation surface in the respective cross-section (in the first azimuthal range).

Moreover, it may in particular be provided that in any cross-section containing the central axis in the second azimuthal range, any steepness of the second compensation surface is at least has high as than any steepness of the first compensation surface in any cross-section containing the central axis in the first azimuthal range.

It turned out that it can be particularly valuable to provide a not-straight (curved) and in particular a concave first compensation surface, in the sense that in any cross-section containing the central axis in the first azimuthal range, the first compensation surface has a steepness decreasing with increasing distance from the central axis.

Providing this can make possible to ensure that in case of relatively small amounts of excess replication material, a sufficient amount of excess replication material can remain in the second azimuthal range, thus ensuring that no void is produced in the second azimuthal range, whereas in case of relatively large amounts of excess replication material, a relatively large amount of excess replication material is present in the first azimuthal range such that only a relatively small amount of excess replication material present in the second azimuthal range, thus ensuring that the footprint in the second azimuthal range does not become undesiredly large.

Furthermore, it turned out that it can be of advantage to provide smooth compensation surfaces, in particular smooth first compensation surfaces, more particularly (first) compensation surfaces having (at least in cross-sections containing the central axis) no edges. Expressed in a more mathematical way, it may be provided that in any cross-section containing the central axis in the (first) azimuthal range, the (first) compensation surface is continuously differentiable. The presence of such edges or not-differentiable points can disturb a continuous flow of replication material in the respective azimuthal range during the replication process and may negatively influence process stability. The provision of edges in other locations, however, may be advantageous, cf. below.

It can in particular be provided that the first compensation surface is smooth (or continuously differentiable) in a cross-section (in particular in any cross-section) including the central axis in the first azimuthal range at least up to a point where a distance of the first compensation surface from the contact plane stops increasing with increasing distance from the central axis, e.g., where the replication tool becomes parallel to the substrate surface.

It can alternatively or in addition be provided that, in any cross-section including the central axis in the first azimuthal range, it applies that throughout the lateral (radial) extension of the first compensation surface, a distance of the first compensation surface from the contact plane increases with increasing distance from the central axis, and that the first compensation surface ends in a distance from the central axis at which a distance of the first compensation surface from the contact plane stops increasing with increasing distance from the central axis.

Similarly, it can be provided that, in any cross-section including the central axis in the second azimuthal range, the second compensation surface ends where the steepness of the second compensation surface becomes zero or changes sign.

Furthermore, it turned out that the provision of straight or even convexly shaped second compensation surfaces can be particularly advantageous, in the sense that in any cross-section containing the central axis in the second azimuthal range, the second compensation surface has a constant steepness or a steepness increasing with increasing distance from the central axis. This way, the increase of footprint with increasing amount of excess replication material is reduced compared to concave shapes.

It can be particularly advantageous to provide in a replication tool both, a concave first compensation surface (in the above-described sense) and a straight or possibly even convex second compensation surface (in the above-described sense). A particularly small increase of radial extension in the second azimuthal range with increasing amount of excess replication material can be achievable this way while providing a high process stability.

It can furthermore be provided that between the central section and one or both of the compensation surfaces, the replication tool (more particularly the surrounding section) has a portion, referred to as retaining portion, in which the replication tool extends particularly close to the contact plane, but does not touch it, as a contact standoff would do. More particularly, it can be provided that in any cross-section containing the central axis in the first azimuthal range and/or in any cross-section containing the central axis in the second azimuthal range, it applies that the surrounding section includes a portion referred to as retaining portion in which the replication tool, in the respective cross-section, has its smallest non-zero distance to the contact plane, and that the retaining portion is located between the central section and the respective compensation surface.

This way, it can become possible to have surface (or capillary) forces acting on the replication material that strongly hold the replication material between replication tool and substrate in the retaining portion or close thereto. Accordingly, it can rather effectively be avoided that replication material (or at least a substantial portion thereof) is removed from the retaining portion or, more importantly, from the central section.

The retaining portion may furthermore extend completely laterally around the central portion while having the described properties also in any other azimuthal range.

The retaining portion may in particular include a section referred to as retaining section in which the replication tool is aligned essentially parallel to the contact plane. In this case, the retaining portion can particularly efficiently effect that replication material (or at least a substantial portion thereof) is removed from the retaining portion or, more importantly, from the central section. The retaining portion may, in particular, be identical with the retaining section.

The vertical distance between the retaining portion and the contact plane may be constant within the first and within the second azimuthal range and may be identical in the first and second azimuthal ranges, in particular, the distance may be identical for all azimuthal angles. However, it is also possible that the distance varies with the azimuthal angle. Accordingly, the same may apply for the retaining section, too.

It can furthermore be provided in one or both of the first and second azimuthal ranges, in particular at least in the second azimuthal range, that the retaining portion adjoins (abuts) the respective compensation surface, and, more particularly, that an edge is present where the retaining portion adjoins (abuts) the respective compensation surface. The retaining portion may substantially be identical with the edge; or the edge may constitute an edge limiting (at the radially outward side) the retaining section (having the above-characterized properties at any azimuthal angle).

The presence of an edge in the described location can provoke or improve the above-described effect of keeping replication material close to the retaining portion and thus of avoiding voids in the central portion.

It is possible and usually contributes to process stability and prevention of voids in the central section (and thus in the optical element) to provide that the retaining portion completely laterally surrounds the central section.

The steepness of the surfaces (in the cross-sections) can, alternatively or in addition, be described by means of angles, in particular of angles between a (local) tangent to the surface or a line (locally) perpendicular to the surface on the one hand, and the central axis or rather the vertical direction or the contact plane on the other hand. This applies, similarly, also to shapes and surfaces of the optical devices, cf. below.

Using a replication tool of the above-described kind makes possible to manufacture specific optical devices.

In particular, the invention may also concern optical devices comprise
  a substrate having a first substrate surface; and
  an optical structure present on the first substrate surface.

The first substrate surface is mentioned also in order to have a reference for directions and distances concerning the optical structure. However, another reference could be used as well.

The optical structure includes an optical element and a surrounding portion laterally surrounding the optical element, wherein the surrounding portion includes a portion referred to as meniscus portion and, between the optical element and the meniscus portion, a portion referred to as intermediate portion.

The surrounding portion provides, in the meniscus portion, a concave meniscus.

And an edge line is present where the meniscus portion and the intermediate portion are adjoining (or abutting).

In a first azimuthal range, the intermediate portion provides a surface facing a vertically aligned central axis of the optical element, referred to as first pull-up surface.

And in a second azimuthal range (which usually is meant to be free from overlap with the first azimuthal range),
(I) the intermediate portion provides a surface facing said central axis of the optical element, referred to as second pull-up surface, wherein the second pull-up surface is more steeply aligned with respect to the central axis than is the first pull-up surface; and/or
(II) the intermediate portion provides a surface, referred to as retaining surface, which, in any cross-section containing the central axis in the second azimuthal range, is aligned essentially parallel to the first substrate surface and has an end at which it is limited by said edge line;
wherein lateral directions are defined as directions parallel to the first substrate surface, and a vertical direction is defined as a direction pointing from the first substrate surface away from the first substrate surface, and wherein an azimuthal range is defined as an angular range in a lateral plane about the central axis.

Optical structures with the described properties can have a particularly strong footprint asymmetry and at the same time have an excellent manufacturability in mass production.

As to case (I), it can in particular be provided that the steepness of the second pull-up surface in any cross-section containing the central axis in the second azimuthal range is higher than the steepness in any cross-section containing the central axis in the first azimuthal range.

The optical structure is made of a replication material, e.g., a polymer such as an epoxy, in particular a curable polymer such as a UV-curable and/or heat-curable polymer.

The optical structure usually is an integrally formed (unitary) part. More particularly, usually the optical element and the surrounding portion are manufactured in one and the same process, and they are made of the same (replication) material and they form a unitary part.

The substrate may be a wafer or a portion of a wafer. It may be made, e.g., of glass or, rather, predominantly or essentially of a polymer material.

The first substrate surface may be essentially flat, in particular in the region where the optical structure is present.

The optical element typically is a passive optical component, e.g., a lens or lens element or some other passive optical component, cf. above for further examples. It may be, e.g., a diffractive element or a refractive element or a combined diffractive and refractive element.

It is typically provided that the surrounding portion completely laterally surrounds the optical element. However, usually it does so at least in the first and the second azimuthal range.

It is typically provided that the meniscus portion completely laterally surrounds the optical element. However, usually it does so at least in the first and the second azimuthal range.

Typically, the intermediate portion adjoins (or abuts) the optical element.

Moreover, usually, the intermediate portion interconnects the meniscus portion and the optical element and/or the surrounding portion essentially consists of the intermediate portion and the meniscus portion.

The concave meniscus usually ends at one end (at its outer end) where it is in contact with the first substrate surface.

It is furthermore typically provided that the edge line completely laterally surrounds the central axis of the optical element or, more particularly completely surrounds the optical element.

The optical device can be, e.g., at least one of: an optical module, in particular an opto-electronic module, a camera (photographic and/or video), a portable or portable mobile device, a computing device, in particular a portable computing device, a tablet computer, a smart phone.

In may be provided, also in case (I), that the retaining surface is present. This corresponds to the possibility of using a replication tool with a retaining section. In particular, the optical structure may have a retaining surface completely laterally surrounding the optical element in which the surrounding portion is aligned parallel to first substrate surface.

In one embodiment, the optical element does not have an edge and an edge surface adjoining said edge, in particular wherein
    said edge would run along a laterally aligned straight line; or
    said edge surface would be a substantially planar surface; or
    said edge surface would be a surface essentially (at least locally) perpendicular to a lateral direction.

In one embodiment, the optical element has a footprint having a borderline or contour on the first substrate surface (corresponding to an aperture shape of the optical element) which does not include a segment constituting a straight line, at least not in the second azimuthal range.

In one embodiment, the optical element has a footprint having a border line or contour on the first substrate surface (corresponding to an aperture shape of the optical element) describing an ellipse, more particularly describing a circle.

In one embodiment, the shape of the optical element is determined essentially by the result of the replication (embossing) process. Thus, there is no subsequent removal of material of the optical element. This applies in particular for the shape of the optical element after it is enclosed in a housing.

As will be clear, several of the properties of the optical device can be attributed to a replication tool by means of which the optical structure is produced. However, the precise shape of the optical structure depends also on the amount of replication material used for its manufacture. In order to not unduly limit the scope of the invention, the above cases (I) and (II) are distinguished. Typically, in case (I), the amount of replication material is larger than in case (II), under otherwise constant conditions, of course. In case a relatively small amount of excess replication material is applied, no second pull-up surface originates, because the replication material does not adhere to the second compensation surface of the replication tool, and accordingly, the meniscus portion ends at the edge line.

As has been described above already, the lateral extension of the optical structure and of the optical element may be such that the distance from the central axis to the outer contour of the footprint of the optical structure minus the distance from the central axis to the outer contour of the footprint of the optical element is, throughout the first azimuthal range, i.e. in any radial direction (with respect to the central axis) within the first azimuthal range, at least three times, rather at least five times, or even at least eight times that same difference of distances throughout the second azimuthal range, i.e. in any radial direction (with respect to the central axis) within second first azimuthal range. In case of very low contact angles between the optical structure and the first substrate surface, e.g., in case the contact angle is below 5°, the footprint of the optical structure (and, accordingly, the distances related thereto) may be hard to determine, and in such cases, the contour of the footprint shall be deemed to be located where the thickness of the optical structure (i.e. its height above the first substrate surface) has reduced to $1/10$ of its thickness at the edge line (always, of course, at the appropriate azimuthal angle, i.e. in the appropriate radial direction).

It is usually provided that contact angles between the replication material and the replication tool are identical in the first and the second azimuthal range.

And it usually provided that contact angles between the replication material and the substrate (more particularly: the first substrate surface) are identical in the first and the second azimuthal range.

It turned out that particularly stable process conditions and good asymmetries can be achieved when materials are chosen such that a contact angle between the replication material (and thus the optical structure) and the first substrate surface is smaller than 40°, in particular smaller than 30°, more particularly smaller than 22°. It is furthermore possible to apply a coating to the first substrate surface with the effect of achieving a particularly small contact angle. Such a coating may be, e.g., an adhesion promoter for increasing an adhesion of the replication material to the (coated) first substrate surface. Contact angles of below 10° and more particularly below 5° can be achieved this way.

Furthermore, it turned out that particularly stable process conditions and good asymmetries can be achieved when materials are chosen such that a contact angle between the replication material (and thus the optical structure) and the replication tool are between 35° and 75°, more particularly between 45° and 65° or even more particularly amount to 55°±7°. Accordingly, the optical structure describes, in a cross-section containing the central axis in the first azimuthal range, at the edge line also this angle; and correspondingly, an angle measurable at the outside of the optical structure at the edge line in a cross-section in the first azimuthal range amounts to 360° minus the contact angle, i.e., e.g., an angle between 285° and 305°.

Typical dimensions of the optical structure and of the optical element, respectively, are as follows:

Maximum height above the first substrate surface: between 5 µm and 300 µm, more particularly between 15 µm and 150 µm;

Maximum lateral extension of footprint of optical element: between 50 µm and 3000 µm, more particularly between 100 µm and 1500 µm;

Minimum lateral extension of footprint of optical element: between 20 µm and 2500 µm, more particularly between 50 µm and 1000 µm;

Maximum radial extension (at first substrate surface) of the optical structure in excess to the optical element, in the first azimuthal range: between 3 µm and 1000 µm, more particularly between 10 µm and 500 µm;

Minimum radial extension (at first substrate surface) of the optical structure in excess to the optical element, in the second azimuthal range: between 1 µm and 400 µm, more particularly between 5 µm and 100 µm.

The method for manufacturing an optical device, includes:
(a) providing a substrate having a first substrate surface;
(b) providing a replication tool of the described kind;
(c) providing an amount of replication material;
(d) moving the substrate and the replication tool towards each other with the amount of replication material between the substrate and the replication tool;
(e) hardening the replication material.

During steps (c) and/or (d), typically during both, the replication material usually is in a liquid or plastically deformable state. And after step (e), this is usually not the case anymore. After step (e) the replication material is at least dimensionally stable.

Typically, the substrate and the replication tool are kept in place during step (e), but it is also possible to provide that they are mutually separated earlier, namely after an initial or partial hardening has been accomplished (and before the hardening process is completed).

Step (d) usually is carried out until the one or more contact standoffs are in contact with the first substrate surface. And in that state, the hardening (step (e)) usually starts.

Step (c) may include dispensing a preselected amount of replication material on the substrate or on the replication tool, in particular in the central section of the replication tool. Step (c) may in particular be accomplished using a dispenser.

The method is usually carried out on wafer level. In that case, a replication tool is structured and designed for producing, in a single embossing step, a plurality of optical structures, e.g., at least 10 or at least 30, or rather at least 50 or even more than 100 optical structures. For that reason, it usually includes a plurality of central sections and associated surrounding sections. Accordingly, a wafer is obtained on which a plurality of optical structures are present. That wafer may be interconnected with one or more further wafers before it is separated into separate optical devices.

Further methods arise from described replication tools and from described optical devices.

BRIEF DESCRIPTION OF THE DRAWINGS

Below, the invention is described in more detail by means of examples and the included drawings. The figures show schematically.

DETAILED DESCRIPTION OF THE INVENTION

The described embodiments are meant as examples and shall not limit the invention.

Figure 1:
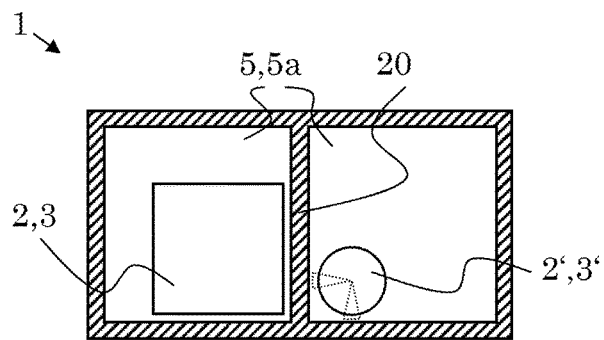
FIG. 1 an illustration of a cross-section through an optical device.
Figure 2:
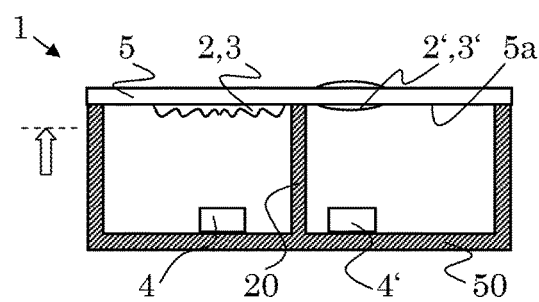
FIG. 2 an illustration of a cross-section through the optical device of FIG. 1.

FIG. 1 is a schematized illustration of a cross-section through an optical device 1 which more particularly is an opto-electronic module. FIG. 2 is a schematized illustration of another cross-section through the optical device 1 of FIG. 1. In FIG. 2, the approximate position of the cross-section of FIG. 1 is indicated by the dashed line.

The optical device 1 includes a substrate 5 and another substrate 50 between which a spacer 20 is present which may be a part separate from the substrates 5 and 50, or may be constitute an integrally formed part, e.g., with substrate 50 as illustrated in FIG. 2.

On a first substrate surface 5a of substrate 5, two optical structures 2, 2' are present which include an optical element 3 and 3', respectively, each. In addition, another optical element is present on the other side of substrate 5.

On substrate 50, two active optical components 4, 4' are present.

The optical elements 3, 3' may be, e.g., refractive optical elements, such as a refractive lens element as illustrated at 3' in FIG. 2, or may be, e.g., diffractive optical elements, such as a diffractive lens element as illustrated at 3 in FIG. 2, or may be other optical elements, in particular other passive optical components.

Spacer 20 is present between substrates 5 and 50 and provides two separate, in particularly optically separated, compartments, one containing optical structure 2 and active optical component 4, the other containing optical structure 2' and active optical component 4'. E.g., the compartments provide different optical channels of optical device 1. Active optical component 4 and optical element 3 are mutually associated and meant to interact, and are optically separate from active optical component 4' and optical element 3', which are mutually associated and also meant to interact.

As can be seen from FIG. 1, the optical elements 3, 3' are positioned (laterally) very close to spacer 20 in certain regions or certain directions (as viewed from the respective optical element), cf., e.g., the dotted triangles at optical element 3' in FIG. 1. However, in other regions (or directions), much space is available (laterally) between the respective optical element 3 and spacer 20 or another component of optical device 1.

If an optical element such as optical element 3 or optical element 3' is produced on a substrate, such as substrate 5, using an embossing-type replication method, it may be necessary to accept the presence of additional (excess) replication material continuous with the optical element but not contributing to the optical element itself. In case of space restrictions, such as illustrated in FIGS. 1 and 2, it can be possible and advisable to asymmetrically distribute that excess replication material. A suitable design of the replication tool used in the replication process can make possible to achieve a locally reduced footprint of the optical structure on a substrate.

Figure 3:
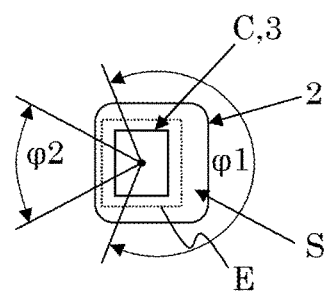
FIG. 3 an illustration of an optical structure and azimuthal ranges.

FIG. 3 is a schematic illustration of an optical structure 2 and different azimuthal ranges φ1, φ2 in which the lateral space taken by the excess replication material is adjusted according to asymmetric space requirements. Lateral means parallel to the substrate surface on which the optical structure is sitting, cf. also item 5a in FIG. 2. And the azimuthal ranges refer to angular ranges about a central axis, which is vertically aligned axis (i.e. an axis aligned perpendicular to the substrate surface) of the optical element, which may coincide with the optical axis of the optical element, e.g., in case of standard circular spherical lenses. More generally the central axis can be defined as a vertical axis passing through the center of mass of the footprint of the optical element on the substrate.

The optical structure 2 includes the optical element 3 and a surrounding portion S, which has radial extension, i.e. a lateral extension measured from the central axis, which varies with the direction, i.e. with the azimuthal angle about the central axis. In azimuthal range φ2, the radial extension is smaller than in azimuthal range φ1.

Between the optical element 3 itself and the outer contour of the footprint of optical structure 2, an edge line E may be present (illustrated by a dotted line) where the optical structure has an edge (in a cross-section containing the central axis), which furthermore usually completely laterally surrounds optical element 3, as illustrated in FIG. 3.

Figure 4:
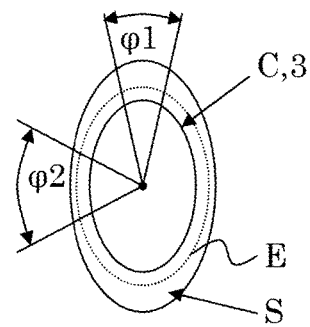
FIG. 4 an illustration of an optical structure and azimuthal ranges.

FIG. 4 is a schematic illustration of another optical structure 2 and different azimuthal ranges φ1, φ2 in which the lateral space taken by excess replication material is adjusted according to asymmetric space requirements. The illustrated situation is in principle like in FIG. 3, but in FIG. 4, the optical element 3 and the optical structure 2 both have a shape different from the one in FIG. 3. And in FIG. 4, the azimuthal ranges φ1, φ2 are mutually arranged in a way different from FIG. 3.

Figure 5:
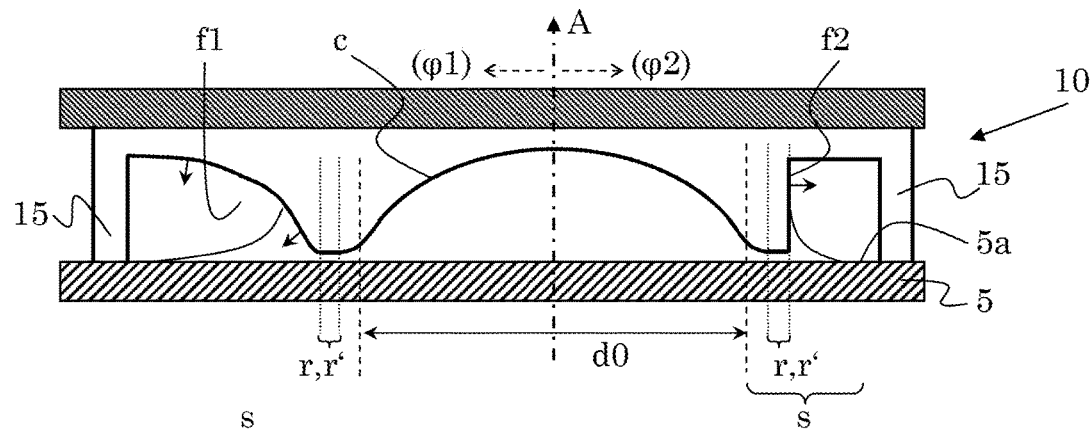
FIG. 5 a cross-section of a replication tool on a substrate.

FIG. 5 is a schematized cross-section of a replication tool 10 on a substrate 5, more particularly on a surface 5a of substrate 5. Replication tool 10 has a central section c, which predominantly determines the shape of the optical element to be produced in an embossing process. Central section c has a central axis coinciding with the central axis of the optical element (when the two are aligned, e.g., during the embossing process when hardening starts). The central axis is referenced A. Axis A is provided with an arrow indicating a vertical direction which is a directed magnitude.

To the left of axis A, a cross-section in the first azimuthal range φ1 is illustrated, and to the right of axis A, a cross-section in the second azimuthal range φ2 is illustrated. Accordingly, depending on the space restrictions and the design of the optical structure and the replication tool, the whole cross-section of FIG. 5 may be a cross-section in a single plane, but might as well be a cross-section in two angled half-planes, e.g., with approximately a right angle between the half-planes. The same applies also to similar cross-sectional illustrations of replication tools or optical structures described below.

One or more contact standoffs 15 are present outside surrounding portion s. They make possible to precisely define the height of optical element. By contact standoffs 15, a contact plane is defined that coincides with substrate surface 5a if replication tool 10 is in contact with substrate surface 5a, like shown in FIG. 5.

Central section c is laterally surrounded by surrounding section s, more particularly, surrounding section s adjoins (or abuts) central section c. In surrounding section s, replication tool 10 includes compensation surfaces f1, f2, which have different steepnesses. Both compensation surfaces f1, f2 face away from central axis A, however, compensation surface f2 is much steeper than compensation surface f1. With increasing distance from axis A, the vertical distance between compensation surface f1 and substrate surface 5a increases relatively slowly with increasing distance from axis A compared to the steep increase compensation surface f2 has (which even rises perpendicularly with respect to substrate surface 5a). This effects that, controlled by surface tension effects (i.e. capillary forces), relatively large amounts of excess replication material will accumulate in the first azimuthal range where a (radially) wide footprint of the optical structure is acceptable, whereas less excess replication material will accumulate in the second azimuthal range where a only (radially) relatively small footprint of the optical structure is acceptable.

Furthermore, the concave cross-sectional shape of compensation surface f1 contributes to this effect. Or, more generally, what contributes to this effect is the fact that a concavity of first compensation surface f1 is more pronounced than a concavity of second compensation surface f2—which is meant to still apply even if second compensation surface f2 is not concave, but flat as illustrated in FIG. 5 or even convex.

Compensation surfaces f1, f2 end where the (cross-sectional) shape of the replication tool becomes aligned parallel to surface 5a.

The thin lines interconnecting compensation surfaces f1 and f2, respectively, with surface 5a illustrate in a schematized way the contour of replication material being formed by repliction tool 10.

The cross-sectional shape of compensation surface f1 is continuously differentiable. Accordingly, it does not have an edge, except possibly at its inner end.

Furthermore, the place where the replication tool 10 (in the cross-section) is closest to surface 5a, contact standoffs and the central section excluded, is considered a retaining portion r' of replication tool 10 which, in the example of FIG. 5, is embodied as a retaining section r in which replication tool 10 is aligned parallel to surface 5a. A provision thereof can very effectively contribute to process stability and to avoiding a formation of voids in the central section during the embossing process and thus in the optical element, in particular if retaining portion r' and retaining section r, respectively, not only partially, but completely laterally surround central section c.

Figure 6:
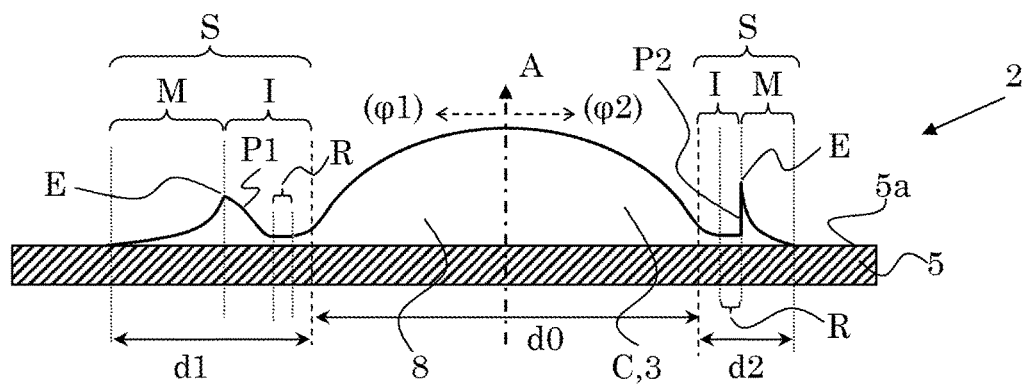
FIG. 6 a cross-section of an optical device produced using the replication tool of FIG. 5.

FIG. 6 is a schematized cross-section of an optical device 1 produced using the replication tool 10 of FIG. 5. The optical structure 2 is made of a replication material 8 such as a curable epoxy (in the cured state). Optical structure 2 is an integrally formed part including or even consisting of a central portion C and a surrounding portion S.

Central portion C constitutes the optical element 3. Surrounding portion S includes a meniscus portion M where it provides a concave meniscus and, adjoining the meniscus portion M at an edge line E, an intermediate portion I. The meniscus portion M and the intermediate portion I have a common edge line E. A choice of the involved materials and more particularly of their respective surface tensions in such a way that a concave meniscus forms during the embossing process has turned out to positively influence the process stability and the formation of a desired asymmetry of the surrounding portion. Along edge line E, optical structure 2 forms a protrusion.

In the intermediate portion I and next to edge line E, a pull-up surface P1 and P2, respectively, is present having a shape which basically is determined by the respective compensation surface f1 and f2, respectively. The presence of an edge at the inner end of one or both pull-up surfaces P1, P2 can enhance process stability and the prevention of void formation. That edge may be, but not necessarily has to be, the place where the replication tool is closest to surface 5a between the respective compensation surface and the central section c. However, it turned out that, if it does, a particularly good process stability and void formation prevention can be achievable. In FIG. 6, an edge is present at the inner end of pull-up surface P2, but not at the inner end of pull-up surface P1, where the (cross-sectional) shape of replication tool 10 is roundish (more particularly: convex and curved).

Furthermore, at the edge, a retaining surface R may be present in which the thickness of the optical structure is constant (in the cross-section), as illustrated in FIG. 6. Also this can enhance process stability and the prevention of void formation.

The (radial) width of surrounding portion S is, due to the choice of the different steepnesses of the compensation surfaces f1, f2, strongly asymmetric, cf—distances d1, d2 in FIG. 6. It can be readily achieved that for the indicated distances d1, d2, the following applies: d1/d2>5 and even d1/d2>10. Reference d0 merely designates an indication of the lateral extension in the specific direction along which the cross-section is taken, provided both halves of the cross-section run along a straight line.

Figure 7:
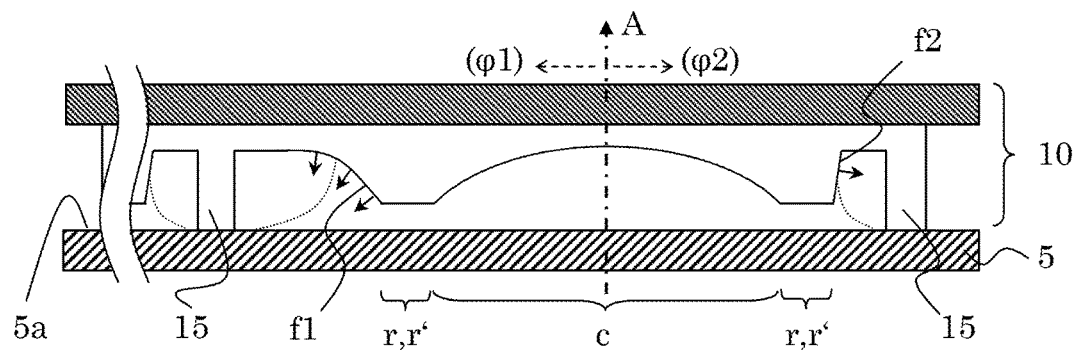
FIG. 7 a cross-section of a replication tool on a substrate.

FIG. 7 is a schematized cross-section of another replication tool 10 on a substrate 5. The reference symbols used in FIG. 7 have already been explained above, cf., e.g., FIG. 5. FIG. 7 shall mainly describe alternatives to features present in the embodiment of FIG. 5. Accordingly, the alternative features may be combined with FIG. 5 individually or in any groups.

In contrast to the embodiment of FIG. 5, in FIG. 7, retaining section r is delimited at both sides (inner and outer limit) by edges, which are present in azimuthal ranges $\varphi1$ and $\varphi2$ and may be present in an azimuthal cross-section. Furthermore, compensation surface f2 is less steeply aligned than in FIG. 5. However, still, any steepness of compensation surface f1 is smaller than any steepness of compensation surface f2.

Figure 8:
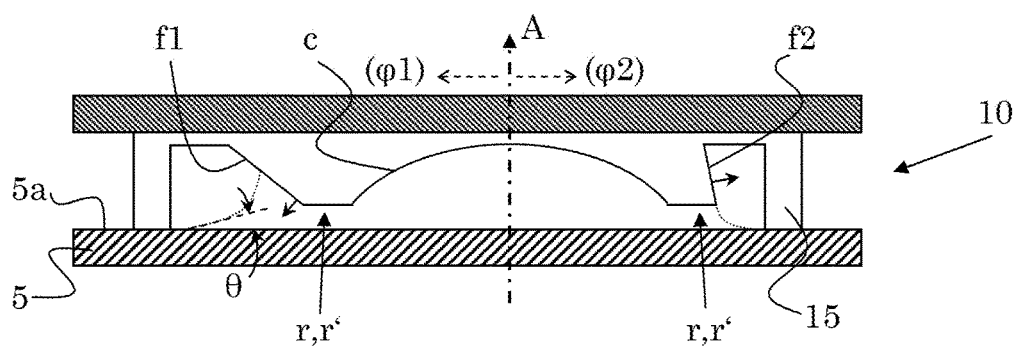
FIG. 8 a cross-section of a replication tool on a substrate.

FIG. 8 is a cross-section of yet another replication tool 10 on a substrate 5. The reference symbols used in FIG. 8 have already been explained above, cf., e.g., FIGS. 5 and 7. FIG. 8 shall mainly describe alternatives to features present in the embodiment of FIGS. 5 and/or 7. Accordingly, the alternative features may be combined with FIG. 5 or 7 individually or in any groups.

In contrast to the embodiment of FIGS. 5 and 7, in FIG. 8, compensation surface f1 is not concave, but has a straight profile. In many cases, however, the concave profile will be preferred for the described reasons. Furthermore, compensation surface f2 is particularly steeply aligned. It even faces partially upwards. Instead of being straight, it might also be curved—which applies also for less steeply aligned compensation surfaces f2 like,e.g., in FIGS. 5 and 7.

A steepness or an inclination or rather an orientation of compensation surface f2 as exemplary illustrated in FIG. 8 can be realized, e.g., in particular in combination with providing that at least a portion of the replication tool 10 is made of a resilient material. If replication tool 10 were rigid in and close to the retaining section r, delamination or cracking of the replicated structure might take place when removing the replication tool after (at least partially) hardening the replication material. On the other hand, it is also possible to use replication material that is (to some degree) resilient when removing the replication tool after (fully or partially) hardening, e.g., curing, it.

Depending mainly on the applied amount of replication material, the replication material may coat a portion of compensation surface f2, e.g., like illustrated in FIGS. 5 and 7. But if a smaller amount of replication material is applied, it may occur that the replication material does not pull up compensation surface f2, but ends at the edge interconnecting compensation surface f2 and retaining portion r' and retaining section r, respectively, e.g., like illustrated in FIG. 8. This phenomenon is linked to the presence of said the, but not (or only loosely) to the steepness of compensation surface f2 and may therefore occur also with other replication tools, e.g., with those described in FIGS. 5 and 7.

A consequence of this phenomenon is that the optical structure produced does not have a second pull-up surface P2 (cf. the dotted lines in FIG. 8, and FIG. 6 where surface P2, however, is present). More particularly, in the second azimuthal range $\varphi2$, the meniscus portion M adjoins the intermediate portion I or in particular the retaining surface R (cf. FIG. 6 where, however, between meniscus portion M and intermediate portion I, surface P2 is present).

Also in case of a particularly steep compensation surface f2 (such as illustrated in FIG. 8), the surrounding portion S of an accordingly produced optical structure forms, like in the other described cases, in the meniscus portion M a surface describing the shape of a concave meniscus.

The steepnesses can be described in terms of changes in vertical direction with increase in radial direction (distances from axis A). But the steepnesses can also be described in terms of an inclination or, accordingly, by means of an angle. E.g., it can be referred to an angle formed between a (local) perpendicular to the compensation surface f1 and f2, respectively (in the respective cross-section), and the vertical direction, cf. the arrow indicated at axis A. The angle shall be measured from the vertical direction to the (local) perpendicular (and always be positive).

In general, the angle will be between 90° and 180° in the first azimuthal range and between 50° (or rather 60°) and 135° in the second azimuthal range.

In FIGS. 5, 7 and 8, small arrows are drawn at the compensation surfaces f1, f2 which indicate some local perpendiculars (which point away from the respective surface).

In FIG. 8, the angle in the first azimuthal range is about 90°, and the angle in the second azimuthal range is about 78°. In FIG. 5, the angle in the first azimuthal range varies from about 90° to 180° (increasing with increasing radial coordinate), and the angle in the second azimuthal range is 90°. And in FIG. 7, the angle in the first azimuthal range varies from about 130° to 180° (increasing with increasing radial coordinate), and the angle in the second azimuthal range is about 98°.

Making use of the angles, it is possible to formulate that it can be provided that the second compensation surface f2 (and also of the first compensation surface f1) ends at a point at which a local perpendicular to the replication tool points prependicularly towards the substrate surface 5a (and thus at a point at which a local perpendicular to the replication tool is antiparallel to the vertical direction).

In order to describe the steepness or shape or alignment of pull-up surfaces of the optical structures, it can be, completely analoguously, be referred to angles, which can be obtained as 180° minus the before-described angle obtained for the compensation surfaces.

In FIG. 8, the contact angle $\theta$ between substrate surface 5a and the replication material of the optical structure is indicated. Suitable contact angles between the replication material and substrate surface 5a and between the replication material and the replication tool can be achieved, e.g., by the following choice of materials:

as replication material, one or more of: epoxy resin, acrylic resin, polyurethane, urethane acrylate, silicone, cyanoacrylate, an organic-inorganic hybrid material (e.g., as known under the tradename of "Ormocer", or sol-gel), a polycarbaminacid derivative;

as material for the replication tool, one or more of: silicone rubber, such as polydimethylsiloxane (PDMS), perflouropolyether (PFPE), PFPE-(meth)acrylate, cyanoacrylate, an organic-inorganic hybrid material (e.g., as known under the tradename of "Ormocer", or sol-gel), polyester, rubber, a polycarbaminacid derivative; as material for the substrate (at substrate surface 5a), one or more of: glass, sapphire, glass-reinforced epoxy such as FR4 or G10, possibly including through-holes filled with a material of a type listed above as replication material, wherein it is possible to use a coating on substrate surface 5a such as a coating based on an inorganic (dielectric and/or partially metallic) optical filter material, based on a polymer-based optical filter material, or based on a photoresist material; wherein the coating may be continuous or may be patterned.

Usually, a replication tool is a wafer-level replication tool having provisions for a multitude of optical structures, e.g., distributed over the wafer along a rectangular grid. In FIG. 7, it is illustrated that and how the replication tool 10 may continue to the left. In a single replication process, a multitude of optical structures can then be produced, e.g. dozens or hundreds or even thousands at a time. At a later time, the so-produced wafer having a multitude of optical structures is singulized into a multitude of optical devices such as, e.g., optical modules, e.g., like those illustrated in FIGS. 1 and 2.

The invention claimed is:

1. An optical device comprising
a substrate having a first substrate surface;
an optical structure present on the first substrate surface;
wherein the optical structure comprises an optical element and a surrounding portion laterally surrounding the optical element,
wherein the surrounding portion comprises a concave meniscus portion and, between the optical element and the meniscus portion, an intermediate portion, wherein an edge line is present where the meniscus portion and the intermediate portion are adjoining,
wherein, in a first azimuthal range, the intermediate portion provides a first pull-up surface facing a vertically aligned central axis of the optical element such that along the first pull-up surface, a height increases in transition from the intermediate portion to the meniscus portion, and wherein a steepness of the first pull-up surface decreases with increasing distance from the central axis, and the first pull-up surface is continuously differentiable, and
wherein in a second azimuthal range,
(I) the intermediate portion provides a second pull-up surface facing said central axis of the optical element such that along the second pull-up surface, a height increases in transition from the intermediate portion to the meniscus portion, wherein the second pull-up surface is more steeply aligned with respect to the central axis than is the first pull-up surface, and wherein the second pull-up surface has a constant steepness; and
(II) the intermediate portion provides a retaining surface, which, in any cross-section containing the central axis in the second azimuthal range, is aligned essentially parallel to the first substrate surface and has an end at which it is limited by said edge line;
wherein in the first and second azimuthal ranges, the meniscus portion is concave shaped,
wherein lateral directions are defined as directions parallel to the first substrate surface, and a vertical direction is defined as a line extending from the first substrate surface and vertically away from the first substrate surface, and wherein an azimuthal range is defined as an angular range in a lateral plane about the central axis, and
wherein the retaining surface in which the surrounding portion is aligned parallel to the first substrate surface completely laterally surrounds the optical element.

2. The optical device according to claim 1, wherein a contact angle between the optical structure and the first substrate surface is smaller than 40°.

3. The optical device according to claim 1, wherein a contact angle between the optical structure and the first substrate surface is smaller than 30°.

4. The optical device according to claim 1, wherein the first azimuthal range is larger than the second azimuthal range.

* * * * *